United States Patent [19]
Evans

[11] Patent Number: 5,916,937
[45] Date of Patent: Jun. 29, 1999

[54] HEAT CURED FLUOROSILICONE RUBBER COMPOSITIONS HAVING IMPROVED COMPRESSION SET

[75] Inventor: Edwin R. Evans, Clifton Park, N.Y.

[73] Assignee: General Electric Company, Waterford, N.Y.

[21] Appl. No.: 08/940,590

[22] Filed: Sep. 30, 1997

[51] Int. Cl.$^6$ ....................................................... C08K 5/34
[52] U.S. Cl. .............................. 524/92; 524/94; 524/105; 524/188; 524/403; 524/433; 524/449; 524/497; 524/493; 524/847; 524/720
[58] Field of Search ................................ 524/92, 94, 105, 524/720, 433, 449, 497, 493, 188, 403, 847

[56] References Cited

U.S. PATENT DOCUMENTS

| | | |
|---|---|---|
| 3,925,181 | 12/1975 | McGinniss . |
| 4,037,018 | 7/1977 | McGinniss . |
| 4,073,830 | 2/1978 | Nyberg . |
| 4,525,528 | 6/1985 | Bush et al. ............................. 524/860 |
| 4,585,848 | 4/1986 | Evans et al. ............................. 528/18 |
| 4,629,761 | 12/1986 | Wolfe, Jr. . |
| 4,720,526 | 1/1988 | Roland . |
| 4,873,091 | 10/1989 | Jankower et al. . |
| 5,085,905 | 2/1992 | Beck . |
| 5,156,843 | 10/1992 | Leong et al. . |
| 5,300,573 | 4/1994 | Patel . |
| 5,500,294 | 3/1996 | Sakumoto et al. . |

*Primary Examiner*—Melvyn I. Marquis
*Attorney, Agent, or Firm*—Kenneth S. Wheelock

[57] ABSTRACT

A heat cured fluorosilicone rubber exhibiting improved compression set comprises N,N'-meta-phenylenedimaleimide.

21 Claims, No Drawings

HEAT CURED FLUOROSILICONE RUBBER COMPOSITIONS HAVING IMPROVED COMPRESSION SET

FIELD OF THE INVENTION

The present invention relates to heat cured fluorosilicone rubbers having improved compression set. More particularly the present invention relates to heat cured fluorosilicone rubbers comprising N,N'-meta-phenylenedimaleimide.

BACKGROUND OF THE INVENTION

Fluorosilicone heat cured elastomeric (HCE) compounds are used in automotive applications to provide gaskets, o-rings and diaphragms. When used as a component of an automobile or truck engine, these materials must display good resistance to hydrocarbon fuels and oils by maintaining good sealing integrity under compression at the elevated temperatures experienced when the engine is operating. At the high temperatures created by an internal combustion engine, fluorosilicone elastomers undergo chain scission reactions with re-crosslinking. When this happens while the fluorosilicone material is under a compression load the material loses sealing performance as measured by compression set. The typical solution to this problem has been to minimize thermal degradation and thermal oxidative degradation by incorporating selected metal oxides either singly or as mixtures. Another approach has been to utilize a highly crosslinked polymer derived from a polymer having a high degree of unsaturation on the polymer backbone and adding a so-called co-agent which imparts resiliency under the removal of a deforming stress. These so-called co-agents are compounds which participate in the free radical cure of the polymer by tending to form more stable free radicals which impart a more extensive or higher state of cure.

A number of these types of compounds have been described and are employed to improve the cured physical property profile of hydrocarbon elastomers. Many of these materials have been used in silicone and fluorosilicone elastomers, e.g. triallylcyanurate, triallylisocyanurate, trimethyl propane trimethylacrylate (available commercially as Sartomer 350®), and tripropylene glycol diacrylate (available commercially as Sartomer 306®). While specific compounds such as zinc dimethylacrylate and zinc diacrylate are effective for improving adhesion between elastomers and metal substrates, the zinc tends to act as an agent to dehydrohalogenate fluorosilicone elastomers leading to formation of olefinic unsaturation which undergoes further crosslinking and thereby deleteriously affecting the compression set of the elastomer. While co-agents such as the Sartomer 350® or 306®) are effective for promoting crosslinking at levels above 0.5 parts per hundred parts elastomer composition, these materials tend to increase elastomer metal adhesion and this results in production problems because the elastomer sticks to the metal molds used to form the gasket, O-ring or diaphragm. Because of these problems it is highly desirable to find either a compound or a class of compounds that promote crosslinking in heat cured fluorosilicone rubbers without creating mold release problems during the forming step.

SUMMARY OF THE INVENTION

The present invention provides an improved fluorosilicone heat cured rubber composition comprising N,N'-meta-phenylenedimaleimide. More particularly, the present invention provides for a fluorosilicone heat cured rubber composition comprising:

a) from about 55.0 to about 61.0 weight percent of a vinyl terminated fluorosilicone homopolymer having the formula:

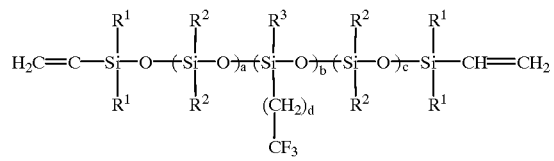

where $R^1$, $R^2$, and $R^3$ are each independently selected from the group consisting of one to ten carbon atom aliphatic or aromatic monovalent hydrocarbon radicals, the subscripts a and c are positive integers which independently range from one to about ten, the subscript b is a positive integer which ranges from about 1,920 to about 4,480, and the subscript d is a positive integer which ranges from two to about six, and a vinyl content ranging from about 70 to about 200 parts per million by weight;

b) from about 1.0 to about 4.0 weight percent of a vinyl terminated vinyl on chain fluorosilicone copolymer having the formula:

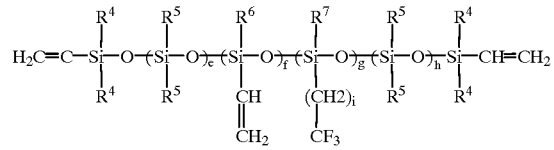

where $R^4$, $R^5$, $R^6$, and $R^7$ are each independently selected from the group consisting of one to ten carbon atom aliphatic or aromatic monovalent hydrocarbon radicals, the subscripts e and h are positive integers which each independently range from one to about twenty-five, the subscript f is a positive integer which ranges from about 700 to about 1,700, the subscript g is a positive integer which ranges from about 2,500 to about 6,500, the subscript i is a positive integer which ranges from two to about six, having a vinyl content ranging from about 3.0 to about 4.5 weight percent;

c) from about 0.04 to about 0.5 weight of 1,3-divinyl-1,1,3,3-tetramethyldisilazane,

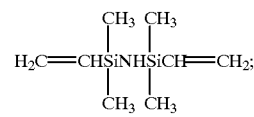

d) from about 0.5 to about 4.0 weight percent of a silanol terminated vinyl on chain copolymeric telomeric fluorosilicone fluid having the formula:

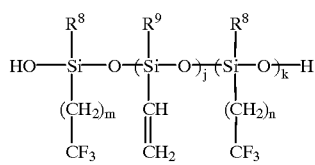
(IV)

where $R^8$ and $R^9$ are each independently selected from the group consisting of one to ten carbon atom aliphatic or aromatic monovalent hydrocarbon radicals, the subscript j is a positive integer which ranges from one to about six, the subscript k is a positive integer which ranges from about one to about six, and the subscripts m and n are a positive integers which each independently range from two to about six where the vinyl content ranges from about 3.0 to about 7.0 weight percent;

e) from about 3.0 to about 10.0 weight percent of a silanol terminated telomeric fluorosilicone fluid having the formula:

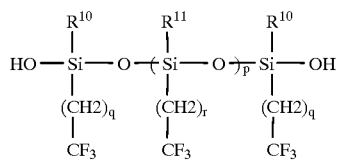

where $R^{10}$ and $R^{11}$ are each independently selected from the group consisting of one to ten carbon atom aliphatic or aromatic monovalent hydrocarbon radicals, the subscript p is a positive integer which ranges from one to about twenty, and the subscripts q and r are positive integers which each independently range from two to about six;

n) from about 8 to about 22 weight percent of fumed or pyrogenic silica, $SiO_2$, reinforcing filler which has an average particle size ranging from about 9 nanometers to about 16 nanometers, with a surface area ranging from about 170 to about 240 $m^2/gm$;

o) from about 0.3 to about 1.5 weight percent of an organic peroxide cure initiator; and p) from about 0.10 to about 2.0 weight percent of N,N'-meta-phenylenedimaleimide.

The present invention also provides for articles of manufacture comprising heat cured fluorosilicone rubber comprising N,N'-meta-phenylenedimaleimide.

DETAILED DESCRIPTION OF THE INVENTION

The present invention relates to heat cured fluorosilicone rubbers that exhibit improved compression set by reason of having added to the formulation N,N'-meta-phenylenedimaleimide. The composition of the heat cured fluorosilicone rubber may contain the following components:

a) from about 55.0 to about 61.0 weight percent, preferably from about 56.0 to about 60.50 weight percent, more preferably from about 57.0 to about 60.30 weight percent, and most preferably from about 57.2 to about 59.9 weight percent of a vinyl terminated fluorosilicone homopolymer having the formula:

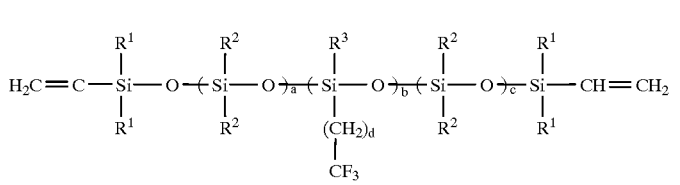
(I)

where $R^1$, $R^2$, and $R^3$ are each independently selected from the group consisting of one to ten carbon atom aliphatic or aromatic monovalent hydrocarbon radicals, preferably methyl, the subscripts a and c are positive integers which range from one to about ten, preferably from one to about six, more preferably from one to about four, and most preferably from one to about three, the subscript b is a positive integer which ranges from about 1,920 to about 4,480, preferably from about 2,560 to about 3,970, more preferably from about 2,880 to about 3,520, and most preferably from about 3,200 to about 3,360, and the subscript d is a positive integer which ranges from two to about six, preferably from two to about four, more preferably from two to about three, and most preferably two and a vinyl content ranging from about 70 to about 200 parts per million by weight (ppm), preferably from about 90 to about 160 ppm, more preferably from about 100 to about 150 ppm and most preferably from about 120 to about 140 ppm;

b) from about 1.0 to about 4.0 weight percent, preferably from about 1.3 to about 3.0 weight percent, more preferably from about 1.5 to about 2.5 weight percent, and most preferably from about 1.6 to about 2.0 weight percent of a vinyl terminated vinyl on chain fluorosilicone copolymer having the formula:

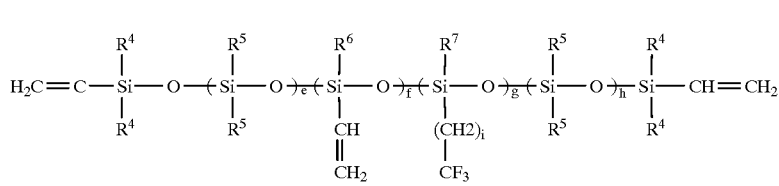

(II)

where $R^4$, $R^5$, $R^6$, and $R^7$ are each independently selected from the group consisting of one to ten carbon atom aliphatic or aromatic monovalent hydrocarbon radicals, preferably methyl, the subscripts e and h are positive integers which independently range from one to about twenty-five, preferably from one to about twenty, more preferably from one to about ten, and most preferably from one to about five, the subscript f is a positive integer which ranges from about 700 to about 1,700, preferably from about 750 to about 1,200, more preferably from about 800 to about 1,000, and most preferably from about 800 to about 900, the subscript g is a positive integer which ranges from about 2,500 to about 6,500, preferably from about 3,000 to about 5,000, more preferably from about 3,100 to about 3,600, and most preferably from about 3,200 to about 3,400, and the subscript i is a positive integer which ranges from two to about six, preferably from two to about four, more preferably from two to about three, and most preferably two, having a vinyl content ranging from about 3.0 to about 4.5 weight percent, preferably from about 3.2 to about 4.0 weight percent, more preferably from about 3.4 to about 3.9 weight percent, and most preferably from about 3.6 to about 3.8 weight percent;

c) from about 0.04 to about 0.5 weight percent, preferably from about 0.06 to about 0.20 weight percent, more preferably from about 0.07 to about 0.15 weight percent, and most preferably from about 0.09 to about 0.11 weight percent of 1,3-divinyl-1,1,3,3-tetramethyldisilazane,

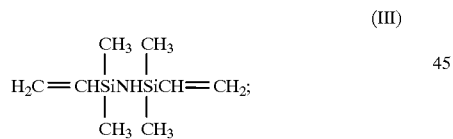

(III)

d) from about 0.5 to about 4.0 weight percent, preferably from about 0.8 to about 3.0 weight percent, more preferably from about 0.85 to about 1.8 weight percent, and most preferably from about 0.9 to about 1.4 weight percent of a silanol terminated vinyl on chain copolymeric telomeric fluorosilicone fluid having the formula:

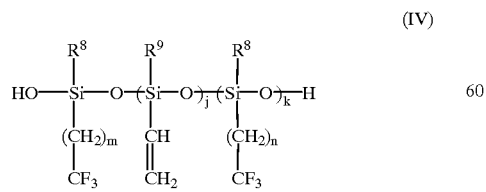

(IV)

where $R^8$ and $R^9$ are each independently selected from the group consisting of one to ten carbon atom aliphatic or aromatic monovalent hydrocarbon radicals, preferably methyl, the subscripts j is a positive integer which ranges from one to about six, preferably from two to about five, more preferably from three to about four, and most preferably from two to about three, the subscript k is a positive integer which ranges from about one to about six, preferably from about two to about ten, more preferably from about two to about six, and most preferably from about three to about ten, and the subscripts m and n are a positive integers which each independently range from two to about six, preferably from two to about four, more preferably from two to about three, and most preferably two where the vinyl content ranges from about 3.0 to about 7.0 weight percent, preferably from about 4.0 to about 7.0 weight percent, more preferably from about 4.5 to about 7.0 weight percent, and most preferably from about 4.8 to about 7.0 weight percent;

e) from about 3.0 to about 10.0 weight percent, preferably from about 3.5 to about 8.0 weight percent, more preferably from about 4.0 to about 7.0 weight percent, and most preferably from about 4.5 to about 6.0 weight percent of a silanol terminated telomeric fluorosilicone fluid having the formula:

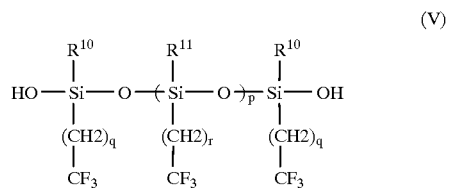

(V)

where $R^{10}$ and $R^{11}$ are each independently selected from the group consisting of one to ten carbon atom aliphatic or aromatic monovalent hydrocarbon radicals, preferably methyl, the subscript p is a positive integer which ranges from one to about twenty, preferably from two to about ten, more preferably from three to about seven, and most preferably from five to about eight, and the subscripts q and r are positive integers which each independently range from two to about six, preferably from two to about four, more preferably from two to about three, and most preferably two where the silanol content ranges from about 5.6 to about 7.0 weight percent, preferably from about 6.0 to about 7.0 weight percent, more preferably from about 6.2 to about 6.7 weight percent, and most preferably from about 6.2 to about 6.5 weight percent;

f) from about 0.01 to about 2.0 weight percent, preferably from about 0.1 to about 1.0 weight percent, more preferably from about 0.2 to about 0.6 weight percent, and most preferably from about 0.2 to about 0.4 weight percent of fumed titanium dioxide, $TiO_2$, having an average particle size ranging from about to 5 nanometers to about 50 nanometers preferably from about 10 nanometers to about 40 nanometers, more preferably from about 10 nanometers to about 30 nanometers, and most preferably from about 15 nanometers to about 25 nanometers, with a surface area ranging from about 10 to about 350 m²/gm, preferably ranging from about 20 to about 200 m²/gm, more preferably ranging from about 25 to about 100 m²/gm, and most preferably ranging from about 25 to about 75 m²/gm;

g) from about 5 to about 25 weight percent, preferably from about 10 to about 20 weight percent, more preferably from about 12 to about 18 weight percent, and most preferably from about 14 to about 16 weight percent of processed mica, having an average particle size ranging from about 10 nanometers to about 15 nanometers, preferably from about 11 to about 14 nanometers, more preferably from about 12 to about 14 nanometers, and most preferably from about 12 to about 13 nanometers;

h) from about 0.01 to about 0.10 weight percent, preferably from about 0.02 to about 0.08 weight percent, more preferably from about 0.02 to about 0.06 weight percent, and most preferably from about 0.02 to about 0.04 weight percent of a 5 to 10 weight percent solution in mineral spirits of iron octoate or 2-ethylhexanoate;

i) from about 0.1 to about 2.0 weight percent, preferably from about 0.2 to about 1.0 weight percent, more preferably from about 0.3 to about 0.8 weight percent, and most preferably from about 0.5 to about 0.6 weight percent of cerium hydroxide, Ce(OH)$_4$;

j) from about 0.1 to about 3.0 weight percent, preferably from about 0.5 to about 2.0 weight percent, more preferably from about 0.7 to about 1.5 weight percent, and most preferably from about 1.0 to about 1.5 weight percent of magnesium oxide, MgO, having an average particle size ranging from about 1 micron to about 20 nanometers, preferably from about 1 to about 6 nanometers, more preferably from about 2 to about 5 nanometers, and most preferably from about 2.5 to about 4 nanometers, with a surface area ranging from about 50 to about 200 m²/gm, preferably ranging from about 80 to about 200 m²/gm, more ranging from about 100 to about 200 m²/gm, and most preferably ranging from about 170 to about 200 m²/gm;

k) from about 0.05 to about 1.0 weight percent, preferably from about 0.1 to about 0.7 weight percent, more preferably from about 0.2 to about 0.5 weight percent, and most preferably from about 0.2 to about 0.4 weight percent of polytetrafluoroethylene resin commercially available from E. I. Du Pont de Nemours & Co., Inc. of Wilmington, Del.;

l) from about 1.0 to about 6.0 weight percent, preferably from about 1.5 to about 4.0 weight percent, more preferably from about 2.0 to about 3.3 weight percent, and most preferably from about 2.0 to about 2.5 weight percent of a vinyl terminated fluorosilicone homopolymer having the formula:

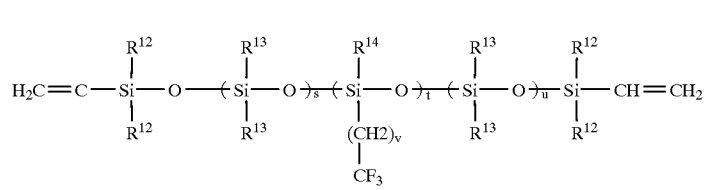

where $R^{12}$, $R^{13}$, and $R^{14}$ are each independently selected from the group consisting of one to ten carbon atom aliphatic or aromatic monovalent hydrocarbon radicals, preferably methyl, the subscripts s and u are positive integers which independently range from one to about 170, preferably from one to about 160, more preferably from one to about 150, and most preferably from one to about 145, the subscript t is a positive integer which ranges from about 155 to about 200, preferably from about 165 to about 190, more preferably from about 170 to about 190, and most preferably from about 170 to about 180, and the subscript v is a positive integer which ranges from two to about six, preferably from two to about five, more preferably from two to about four, and most preferably two, subject to the limitation that the molecular weight as defined by choice of the subscripts s, t, u, and v is below that of component a) as defined by the choice of subscripts a, b, c, and d for component a) wherein the vinyl content ranges from about 0.05 to about 0.15 weight percent, preferably from about 0.08 to about 0.13 weight percent, more preferably from about 0.09 to about 0.12 weight percent, and most preferably from about 0.10 to about 0.12 weight percent;

m) from about 0.4 to about 2.0 weight percent, preferably from about 0.5 to about 1.0 weight percent, more preferably from about 0.5 to about 0.8 weight percent, and most preferably from about 0.5 to about 0.7 weight percent of a polydimethylsiloxane silicone fluid having a viscosity ranging from about 20 to about 40, preferably from about 25 to about 35, more preferably from about 28 to about 35, and most preferably from about 28 to about 32 centipoise at 25° C., which is typically used as a carrier for components i) and j);

n) from about 8 to about 22 weight percent, preferably from about 10 to about 18 weight percent, more preferably from about 12 to about 18 weight percent, and most preferably from about 15 to about 17 weight percent of a reinforcing filler preferably fumed or pyrogenic silica, SiO$_2$, which has an average particle size ranging from about 9 nanometers to about 16 nanometers, preferably from about 10 nanometers to about 16 nanometers, more preferably from about 10 nanometers to about 14 nanometers, and most preferably from about 11 nanometers to about 13 nanometers, with a surface area ranging from about 170 to about 240 m²/gm, preferably ranging from about 175 to about 225 m²/gm, more preferably ranging from about 190 to about 210 m²/gm, and most preferably ranging from about 195 to about 205 m²/gm;

o) from about 0.3 to about 1.5 weight percent, preferably from about 0.4 to about 1.0 weight percent, more preferably from about 0.4 to about 0.8 weight percent, and most preferably from about 0.5 to about 0.8 weight percent of an organic peroxide to initiate cure of the composition selected from the group consisting of 2,5-dimethyl-2,5-di-(tert-butylperoxy)hexane, 2,5-dimethyl-2,5-di-(tert-butylperoxy)hexyne-3, dicumyl peroxide, and 2,5-dichloro benzoyl peroxide and α,α'-di(t-butylperoxy)-di-iso-propylbenzene, preferably 2,5-dimethyl-2,5-di-(tert-butylperoxy)hexane; and p) from about 0.10 to about 2.0 weight percent, preferably from about 0.12 to about 1.5 weight percent, more preferably from about 0.15 to about 0.8 weight percent, and most preferably from about 0.15 to about 0.65 weight percent of N,N'-meta-phenylenedimaleimide.

The various $R^i$, i=1, . . . 14, for the components a), b), d), e) and m) are preferably each independently selected from the group consisting of methyl, ethyl, propyl, 1,1,1-trifluoropropyl, n-butyl, iso-butyl, tert-butyl, phenyl, and benzyl depending upon the specific application for which the heat cured rubber is to be used.

It has also been desirable to include on an optional basis, optional component q) from about 0.1 to about 1.5 weight percent, preferably from about 0.2 to about 1.0 weight percent, more preferably from about 0.2 to about 0.6 weight percent, and most preferably from about 0.3 to about 0.5 weight percent of tripropylene glycol diacrylate, which has the formula:

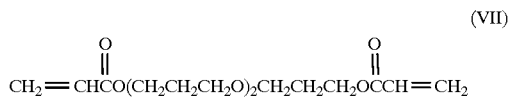

(VII)

and is available commercially as Sartomer 306® from Sartomer Inc. of West Chester, Pa.

Higher Durometer materials may be compounded by increasing the cross-link density of the elastomer. This is accomplished by incorporating a high vinyl content fluorosilicone copolymer, optional component r), having the formula:

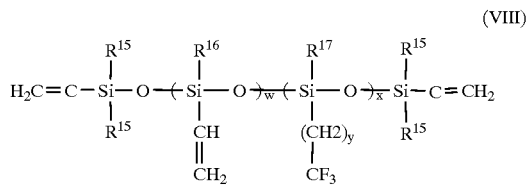

(VIII)

where $R^{15}$, $R^{16}$, and $R^{17}$ are each independently selected from the group consisting of one to ten carbon atom aliphatic or aromatic monovalent hydrocarbon radicals, preferably methyl, the subscript w is a positive integer which independently range from about 180 to about 240, preferably from about 185 to about 220, more preferably from about 185 to about 200, and most preferably from about 190 to about 200, the subscript x is a positive integer which independently range from about 2,200 to about 2,500, preferably from about 2,210 to about 2,400, more preferably from about 2,300 to about 2,400, and most preferably from about 2,330 to about 2,340, the subscript y is a positive integer which ranges from about 2 to about 6, preferably from about 2 to about 5, more preferably from about 2 to about 4, and most preferably from about 2 to about 3, having a vinyl content ranging from about 1.2 to about 2.5 weight percent, preferably from about 1.4 to about 2.0 weight percent, more preferably from about 1.4 to about 1.8 weight percent, and most preferably from about 1.4 to about 1.6 weight percent.

The heat curable fluorosilicone elastomeric compositions of the present invention must contain components a), b), c), d) e), a reinforcing filler preferably fumed silica component n), a peroxide initiator, component o), and N,N'-meta-phenylenedimaleimide, component p). The remaining components are added to improve or control various properties such as Durometer, heat age stability, tensile, and elongation. For example, higher Durometer material may be prepared by adding a high vinyl fluorosilicone cross-linking compound such as component r) to increase the cross link density. When that is done, compression set is adversely affected to some degree which may be compensated for by reducing the amount of filler.

Experimental

The following examples are for purposes of demonstrating a reduction to practice and embodiments of the invention and are not to be construed as limiting the appended claims in any manner.

Samples of heat curable fluorosilicone elastomer are cured by press curing the rubber at 177° C. (350° F.) for 10 minutes followed by a post bake at 204° C. (400° F.) for 4 hours. The compression set was measured by following a variation of the ASTM D-395 test. One half inch sheets of the heat cured rubber are prepared and cylindrical plugs having a diameter of one inch are cut from the sheet and subjected to the ASTM D-395 test procedure instead of the laminate called for in the test description.

The following two heat curable fluorosilicone rubber formulations were prepared:

| Component | Composition A parts by weight | Composition B parts by weight |
|---|---|---|
| N,N'-meta-phenylenedimaleimide | 0.00 | 0.18 |
| Component a) | 97.00 | 59.86 |
| Component b) | 3.00 | 1.85 |
| Component c) | 0.15 | 0.09 |
| Component d) | 2.00 | 1.20 |
| Component e) | 8.00 | 4.90 |
| Fe octoate | 0.05 | 0.03 |
| TiO2 | 0.50 | 0.30 |
| Fumed Silica | 25.00 | 15.43 |
| Mica | 24.00 | 14.81 |
| Teflon ™ resin | 0.50 | 0.30 |
| Ce(OH)4 | 0.90 | 0.55 |
| Magnesium oxide | 0.50 | 0.30 |

These two heat curable fluorosilicone rubber compositions were then compounded as follows:

| Heat Curable Rubber | Control | Composition I | Composition II |
|---|---|---|---|
| all compositions are in parts by weight | | | |
| Composition A | 100 | 100 | 0 |
| Composition B | 0 | 0 | 100 |
| Sartomer 306 | 0 | 0.3 | 0 |
| Luperco 101XL | 1.0 | 1.0 | 1.0 |
| Physical Properties | | | |
| Shore A | 60 | 62 | 64 |
| 100% Modulus | 520 | 534 | 563 |
| Tensile, psi | 1120 | 1049 | 1016 |
| Elongation, % | 345 | 318 | 300 |
| Specific Gravity | 1.541 | 1.548 | |

| Heat Curable Rubber | Control | Composition I | Composition II |
|---|---|---|---|
| 1.556 | | | |
| Die B Tear | 106 | 121 | 131 |
| Compression Set | | | |
| 22 hr. at 350° F. | 14.0 | 12.3 | 7.3 |
| 70 hr. at 350° F. | 32.0 | 27.0 | |
| 16.5 | | | |
| % Swell (Immersion 70 hr. in M25 fuel at 25° C.) | 34 | 31.4 | |
| 29.1 | | | |

An additional three heat curable fluorosilicone rubbers were prepared.

| Component | Comp'n. E parts by weight | Comp'n. F parts by weight | Comp'n. G parts by weight |
|---|---|---|---|
| N,N'-meta-phenylenedimaleimide | 0.00 | 0.30 | 0.18 |
| Component a) | 94.00 | 94.00 | 57.23 |
| Component b) | 2.80 | 2.80 | 1.70 |
| Component c) | 0.15 | 0.15 | 0.09 |
| Component d) | 1.50 | 1.50 | 0.913 |
| Component e) | 9.00 | 8.50 | 5.175 |
| Component r) | 4.20 | 4.20 | 2.557 |
| Fumed silica | 29.50 | 29.50 | 17.0 |
| Mica | 23.00 | 23.00 | 12.176 |
| TiO2 | 2.00 | 2.00 | 1.217 |
| Fe octoate | 0.10 | 0.10 | 0.060 |
| GLT-904* | 1.00 | 1.00 | 0.60 |
| Ce(OH)4 | 1.00 | 1.00 | 0.60 |
| Magnesium oxide | 0.70 | 0.70 | 0.426 |

*GLT-904 ™ (formerly RA-904) a particulate form of Wollastonite, which is a mineral form of calcium silicate, coated with polytetrafluoroethylene (PTFE) consisting of approximately 50 wt. % Wollastonite and 50 wt. % PTFE primarily used as a process aid to enhance green strength and processibility is available from Permaflex Mold of Columbus, Ohio.

These compositions were compounded into rubbers as follows:

| Heat Curable Rubber | Control III | Comp'n. IV | Comp'n V |
|---|---|---|---|
| all compositions are in parts by weight | | | |
| Composition E | 100 | 0 | 0 |
| Composition F | 0 | 100 | 0 |
| Composition G | 0 | 0 | 100 |
| Luperco 101XL | 1.0 | 1.0 | 1.0 |
| Physical Properties | | | |
| Shore A | 65.6 | 68.4 | 65.5 |
| 100% Modulus | 505 | 613 | — |
| Tensile, psi | 1,028 | 997 | 1,001 |
| Elongation, % | 292 | 243 | 271 |
| Specific Gravity | 1.548 | 1.552 | 1.534 |
| Die B Tear | 108 | 113 | 109 |
| Compression Set | | | |
| 22 hr. at 350° F. | 13.6 | 9.7 | 12.4 |
| 70 hr. at 350° F. | 24.8 | 21.1 | 21.5 |
| Heat Age (% change) 70 hours at 400° F. | | | |
| Shore A | +2.5 + | 2.0 | +1.7 |
| Tensile | −26 | −25 | −26 |
| Elongation | −29 | −28 | −29 |

| Heat Curable Rubber | Control III | Comp'n. IV | Comp'n V |
|---|---|---|---|
| 70 hours at 437° F. | | | |
| Shore A | +2.0+ | −1.0 | −1.0 |
| Tensile | −47 | −44 | −43 |
| Elongation | −48 | −33 | −35 |

The use of N,N'-meta-phenylenedimaleimide in conjunction with a peroxide curing agent improves the compression set of the heat cured fluorosilicone rubber. Standard deviation for the compression set test is 1.27, thus Composition II represents a significant improvement over both the control and Composition I. Thus, compositions of the present invention have a percent compression set that is 12.4 or less when measured after 22 hours at 350° F. Further the use of N,N'-meta-phenylenedimaleimide improves the retention of physical properties in fluorosilicone articles of manufacture under heat aging conditions.

Having described the invention that which is claimed is:

1. A heat curable fluorosilicone rubber comprising:

a) from about 55.0 to about 61.0 weight percent of a vinyl terminated fluorosilicone homopolymer having the formula:

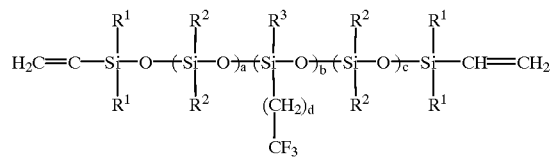

where $R^1$, $R^2$, and $R^3$ are each independently selected from the group consisting of one to ten carbon atom aliphatic and aromatic monovalent hydrocarbon radicals, the subscripts a and c are positive integers which independently range from one to about ten, the subscript b is a positive integer which ranges from about 1,920 to about 4,480, and the subscript d is a positive integer which ranges from two to about six, and a vinyl content ranging from about 70 to about 200 parts per million by weight;

b) from about 1.0 to about 4.0 weight percent of a vinyl terminated vinyl on chain fluorosilicone copolymer having the formula:

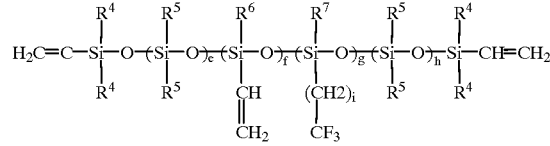

where $R^4$, $R^5$, $R^6$, and $R^7$ are each independently selected from the group consisting of one to ten carbon atom aliphatic and aromatic monovalent hydrocarbon radicals, the subscripts e and h are positive integers which each independently range from one to about twenty-five, the subscript f is a positive integer which ranges from about 700 to about 1,700, the subscript g is a positive integer which ranges from about 2,500 to about 6,500, the subscript i is a positive integer which ranges from two to about six, having a vinyl content ranging from about 3.0 to about 4.5 weight percent;

c) from about 0.04 to about 0.5 weight of 1,3-divinyl-1, 1,3,3-tetramethyldisilazane,

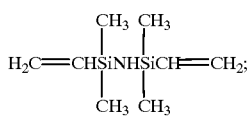

d) from about 0.5 to about 4.0 weight percent of a silanol terminated vinyl on chain copolymeric telomeric fluorosilicone fluid having the formula:

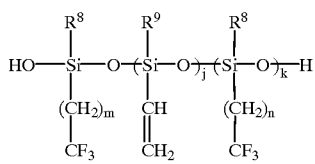

where $R^8$ and $R^9$ are each independently selected from the group consisting of one to ten carbon atom aliphatic and aromatic monovalent hydrocarbon radicals, the subscript j is a positive integer which ranges from one to about six, the subscript k is a positive integer which ranges from about one to about six, and the subscripts m and n are a positive integers which each independently range from two to about six where the vinyl content ranges from about 3.0 to about 7.0 weight percent;

e) from about 3.0 to about 10.0 weight percent of a silanol terminated telomeric fluorosilicone fluid having the formula:

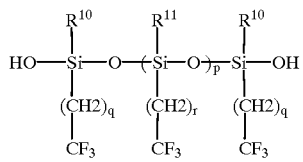

where $R^{10}$ and $R^{11}$ are each independently selected from the group consisting of one to ten carbon atom aliphatic and aromatic monovalent hydrocarbon radicals, the subscript p is a positive integer which ranges from one to about twenty, and the subscripts q and r are positive integers which each independently range from two to about six;

n) from about 8 to about 22 weight percent of fumed or pyrogenic silica, $SiO_2$, reinforcing filler which has an average particle size ranging from about 9 nanometers to about 16 nanometers, with a surface area ranging from about 170 to about 240 $m^2/gm$;

o) from about 0.3 to about 1.5 weight percent of an organic peroxide cure initiator; and p) from about 0.10 to about 2.0 weight percent of N,N'-meta-phenylenedimaleimide.

2. The composition of claim 1 further comprising:

f) from about 0.01 to about 2.0 weight percent of fumed titanium dioxide, $TiO_2$, having an average particle size ranging from about to 5 nanometers to about 50 nanometers, with a surface area ranging from about 10 to about 350 $m^2/gm$.

3. The composition of claim 2 further comprising:

g) from about 5 to about 25 weight percent of processed mica having an average particle size ranging from about 10 nanometers to about 15 nanometers.

4. The composition of claim 3 further comprising:

h) from about 0.01 to about 0.10 weight percent of a 5 to 10 weight percent solution in mineral spirits of iron octoate or 2-ethylhexanoate.

5. The composition of claim 4 further comprising:

i) from about 0.1 to about 2.0 weight percent of cerium hydroxide, $Ce(OH)_4$.

6. The composition of claim 5 further comprising:

j) from about 0.1 to about 3.0 weight percent of magnesium oxide, MgO, having an average particle size ranging from about 1 micron to about 20 nanometers, with a surface area ranging from about 50 to about 200 $m^2/gm$.

7. The composition of claim 6 further comprising:

k) from about 0.05 to about 1.0 weight percent of polytetrafluoroethylene resin.

8. The composition of claim 7 further comprising:

l) from about 1.0 to about 6.0 weight percent of a vinyl terminated fluorosilicone homopolymer having the formula:

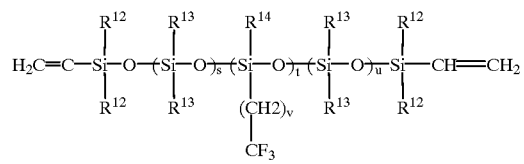

where $R^{12}$, $R^{13}$, and $R^{14}$ are each independently selected from the group consisting of one to ten carbon atom aliphatic and aromatic monovalent hydrocarbon radicals, the subscripts s and u are positive integers which independently range from one to about 170, the subscript t is a positive integer which ranges from about 155 to about 200 the subscript v is a positive integer which ranges from two to about six, subject to the limitation that the molecular weight as defined by choice of the subscripts s, t, u, and v is below that of component a) as defined by the choice of subscripts a, b, c, and d for component a) wherein the vinyl content ranges from about 0.05 to about 0.15 weight percent.

9. The composition of claim 8 further comprising:

m) from about 0.4 to about 2.0 weight percent of a polydimethylsiloxane silicone fluid having a viscosity ranging from about 20 to about 40 centipoise at 25° C.

10. A heat curable fluorosilicone rubber consisting essentially of:

a) from about 55.0 to about 61.0 weight percent of a vinyl terminated fluorosilicone homopolymer having the formula:

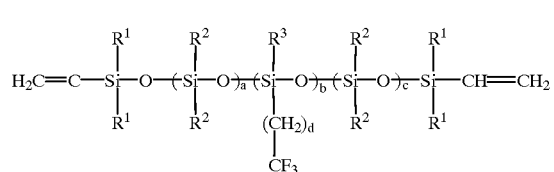

where $R^1$, $R^2$, and $R^3$ are each independently selected from the group consisting of one to ten carbon atom aliphatic and aromatic monovalent hydrocarbon radicals, the subscripts a and c are positive integers which independently range from one to about ten, the subscript b is a positive integer which ranges from about 1,920 to about 4,480, and the subscript d is a positive integer which ranges from two to about six, and a vinyl content ranging from about 70 to about 200 parts per million by weight;

b) from about 1.0 to about 4.0 weight percent of a vinyl terminated vinyl on chain fluorosilicone copolymer having the formula:

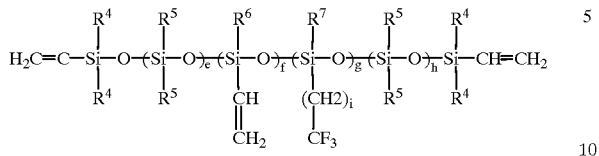

where $R^4$, $R^5$, $R^6$, and $R^7$ are each independently selected from the group consisting of one to ten carbon atom aliphatic and aromatic monovalent hydrocarbon radicals, the subscripts e and h are positive integers which each independently range from one to about twenty-five, the subscript f is a positive integer which ranges from about 700 to about 1,700, the subscript g is a positive integer which ranges from about 2,500 to about 6,500, the subscript i is a positive integer which ranges from two to about six, having a vinyl content ranging from about 3.0 to about 4.5 weight percent;

c) from about 0.04 to about 0.5 weight of 1,3-divinyl-1,1,3,3-tetramethyldisilazane,

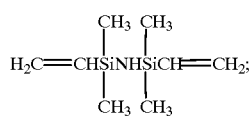

d) from about 0.5 to about 4.0 weight percent of a silanol terminated vinyl on chain copolymeric telomeric fluorosilicone fluid having the formula:

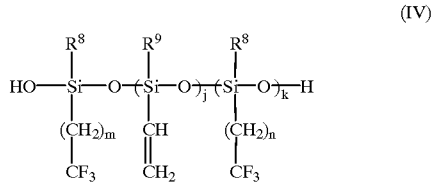

(IV)

where $R^8$ and $R^9$ are each independently selected from the group consisting of one to ten carbon atom aliphatic and aromatic monovalent hydrocarbon radicals, the subscript j is a positive integer which ranges from one to about six, the subscript k is a positive integer which ranges from about one to about six, and the subscripts m and n are a positive integers which each independently range from two to about six where the vinyl content ranges from about 3.0 to about 7.0 weight percent;

e) from about 3.0 to about 10.0 weight percent of a silanol terminated telomeric fluorosilicone fluid having the formula:

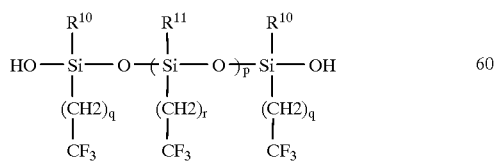

where $R^{10}$ and $R^{11}$ are each independently selected from the group consisting of one to ten carbon atom aliphatic and aromatic monovalent hydrocarbon radicals, the subscript p is a positive integer which ranges from one to about twenty, and the subscripts q and r are positive integers which each independently range from two to about six;

n) from about 8 to about 22 weight percent of fumed or pyrogenic silica, $SiO_2$, reinforcing filler which has an average particle size ranging from about 9 nanometers to about 16 nanometers, with a surface area ranging from about 170 to about 240 $m^2/gm$;

o) from about 0.3 to about 1.5 weight percent of an organic peroxide cure initiator; and p) from about 0.10 to about 2.0 weight percent of N,N'-meta-phenylenedimaleimide.

11. The composition of claim 10 further consisting essentially of:

f) from about 0.01 to about 2.0 weight percent of fumed titanium dioxide, $TiO_2$, having an average particle size ranging from about to 5 nanometers to about 50 nanometers, with a surface area ranging from about 10 to about 350 $m^2/gm$.

12. The composition of claim 11 further consisting essentially of:

g) from about 5 to about 25 weight percent of processed mica having an average particle size ranging from about 10 nanometers to about 15.

13. The composition of claim 12 further consisting essentially of:

h) from about 0.01 to about 0.10 weight percent of a 5 to 10 weight percent solution in mineral spirits of iron octoate or 2-ethylhexanoate.

14. The composition of claim 13 further consisting essentially of:

i) from about 0.1 to about 2.0 weight percent of cerium hydroxide, $Ce(OH)_4$.

15. The composition of claim 14 further consisting essentially of:

j) from about 0.1 to about 3.0 weight percent of magnesium oxide, MgO, having an average particle size ranging from about 1 micron to about 20 nanometers, with a surface area ranging from about 50 to about 200 $m^2/gm$.

16. The composition of claim 15 further consisting essentially of:

k) from about 0.05 to about 1.0 weight percent of polytetrafluoroethylene resin.

17. The composition of claim 16 further consisting essentially of:

l) from about 1.0 to about 6.0 weight percent of a vinyl terminated fluorosilicone homopolymer having the formula:

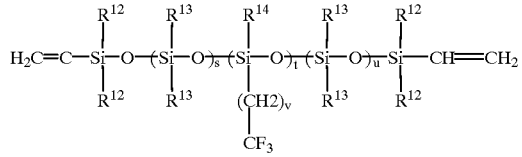

where $R^{12}$, $R^{13}$, and $R^{14}$ are each independently selected from the group consisting of one to ten carbon atom aliphatic and aromatic monovalent hydrocarbon radicals, the subscripts s and u are positive integers which independently range from one to about 170, the subscript t is a positive integer which ranges from about 155 to about 200 the subscript v is a positive integer which ranges from two to about six, subject to the limitation that the molecular weight as defined by choice of the subscripts s, t, u, and v is below that of component a) as defined by the choice of subscripts a, b, c, and d for component a) wherein the vinyl content ranges from about 0.05 to about 0.15 weight percent.

18. The composition of claim 17 further consisting essentially of:
m) from about 0.4 to about 2.0 weight percent of a polydimethylsiloxane silicone fluid having a viscosity ranging from about 20 to about 40 centipoise at 25° C.

19. A heat curable fluorosilicone rubber comprising:
a) from about 55.0 to about 61.0 weight percent of a vinyl terminated fluorosilicone homopolymer having the formula:

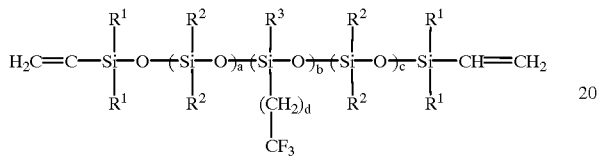

where $R^1$, $R^2$, and $R^3$ are each independently selected from the group consisting of one to ten carbon atom aliphatic and aromatic monovalent hydrocarbon radicals, the subscripts a and c are positive integers which independently range from one to about ten, the subscript b is a positive integer which ranges from about 1,920 to about 4,480, and the subscript d is a positive integer which ranges from two to about six, and a vinyl content ranging from about 70 to about 200 parts per million by weight;

b) from about 1.0 to about 4.0 weight percent of a vinyl terminated vinyl on chain fluorosilicone copolymer having the formula:

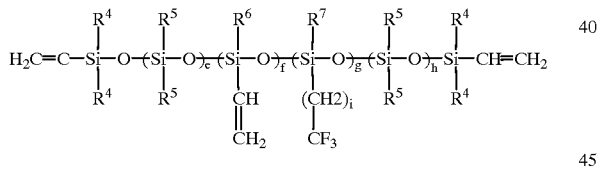

where $R^4$, $R^5$, $R^6$, and $R^7$ are each independently selected from the group consisting of one to ten carbon atom aliphatic and aromatic monovalent hydrocarbon radicals, the subscripts e and h are positive integers which each independently range from one to about twenty-five, the subscript f is a positive integer which ranges from about 700 to about 1,700, the subscript g is a positive integer which ranges from about 2,500 to about 6,500, the subscript i is a positive integer which ranges from two to about six, having a vinyl content ranging from about 3.0 to about 4.5 weight percent;

c) from about 0.04 to about 0.5 weight of 1,3-divinyl-1,1,3,3-tetramethyldisilazane,

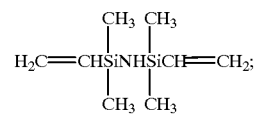

d) from about 0.5 to about 4.0 weight percent of a silanol terminated vinyl on chain copolymeric telomeric fluorosilicone fluid having the formula:

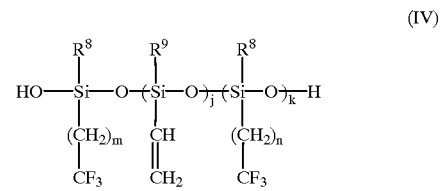

where $R^8$ and $R^9$ are each independently selected from the group consisting of one to ten carbon atom aliphatic and aromatic monovalent hydrocarbon radicals, the subscript j is a positive integer which ranges from one to about six, the subscript k is a positive integer which ranges from about one to about six, and the subscripts m and n are a positive integers which each independently range from two to about six where the vinyl content ranges from about 3.0 to about 7.0 weight percent;

e) from about 3.0 to about 10.0 weight percent of a silanol terminated telomeric fluorosilicone fluid having the formula:

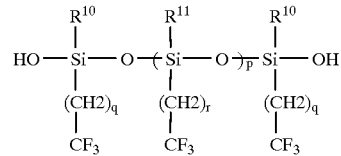

where $R^{10}$ and $R^{11}$ are each independently selected from the group consisting of one to ten carbon atom aliphatic and aromatic monovalent hydrocarbon radicals, the subscript p is a positive integer which ranges from one to about twenty, and the subscripts q and r are positive integers which each independently range from two to about six;

n) from about 8 to about 22 weight percent of fumed or pyrogenic silica, $SiO_2$, reinforcing filler which has an average particle size ranging from about 9 nanometers to about 16 nanometers, with a surface area ranging from about 170 to about 240 $m^2/gm$;

o) from about 0.3 to about 1.5 weight percent of an organic peroxide cure initiator; and p) from about 0.10 to about 2.0 weight percent of N,N'-meta-phenylenedimaleimide;

whereby compression set of the heat curable fluorosilicone rubber when cured is below about 14.

20. An article of manufacture comprising the composition of claim 1.

21. The article of manufacture of claim 20 wherein said article is an o-ring, a diaphragm, or a gasket.

* * * * *